(12) United States Patent
Carrier et al.

(10) Patent No.: US 11,640,430 B2
(45) Date of Patent: May 2, 2023

(54) CUSTOM SEMANTIC SEARCH EXPERIENCE DRIVEN BY AN ONTOLOGY

(71) Applicant: International Business Machines Corporation, Armonk, NY (US)

(72) Inventors: Scott Carrier, New Hill, NC (US); Pai-Fang Hsiao, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 16/940,673

(22) Filed: Jul. 28, 2020

(65) Prior Publication Data

US 2022/0035866 A1   Feb. 3, 2022

(51) Int. Cl.
*G06F 16/9032* (2019.01)
*G06F 40/30* (2020.01)
*G06F 40/295* (2020.01)
*G06F 40/205* (2020.01)

(52) U.S. Cl.
CPC .. *G06F 16/90324* (2019.01); *G06F 16/90332* (2019.01); *G06F 40/30* (2020.01); *G06F 40/205* (2020.01); *G06F 40/295* (2020.01)

(58) Field of Classification Search
CPC ......... G06F 16/90324; G06F 16/90332; G06F 40/30
See application file for complete search history.

(56) References Cited

U.S. PATENT DOCUMENTS

| | | | |
|---|---|---|---|
| 7,027,974 B1 | 4/2006 | Busch et al. | |
| 7,505,989 B2 | 3/2009 | Gardner et al. | |
| 7,558,778 B2 | 7/2009 | Carus et al. | |
| 8,442,940 B1 * | 5/2013 | Faletti | G06F 40/30 707/610 |
| 9,189,531 B2 | 11/2015 | Joshi et al. | |
| 9,336,306 B2 | 5/2016 | Mcateer et al. | |
| 9,436,760 B1 | 9/2016 | Tacchi et al. | |
| 9,710,544 B1 | 7/2017 | Smith et al. | |
| 9,892,111 B2 | 2/2018 | Danielyan et al. | |
| 10,984,780 B2 | 4/2021 | Bellegarda | |
| 11,222,052 B2 | 1/2022 | Hertz et al. | |
| 2003/0018616 A1 | 1/2003 | Wilbanks et al. | |
| 2004/0243595 A1 | 12/2004 | Chi et al. | |
| 2006/0053172 A1 | 3/2006 | Gardner et al. | |
| 2007/0038609 A1 | 2/2007 | Wu et al. | |
| 2008/0040308 A1 | 2/2008 | Ranganathan et al. | |
| 2009/0164441 A1 | 6/2009 | Cheyer et al. | |

(Continued)

OTHER PUBLICATIONS

Celino et al., "Squiggle: a semantic search engine for indexing and retrieval of multimedia content." Proceedings of the 1st International Conference on Semantic-Enhanced Multimedia Presentation Systems-vol. 228. CEUR-WS.org, 2006, 84 pages.

(Continued)

*Primary Examiner* — Taelor Kim

(74) *Attorney, Agent, or Firm* — Cantor Colburn LLP; Kelsey Skodje

(57) ABSTRACT

Techniques include updating a semantic search function with a custom ontology, the semantic search function initially supporting a separate ontology having been used to enrich a corpus. The custom ontology is used to augment input of a search query for the semantic search function, thereby providing a custom user experience for searching the corpus.

20 Claims, 13 Drawing Sheets

(56) References Cited

U.S. PATENT DOCUMENTS

| | | |
|---|---|---|
| 2009/0182738 A1 | 7/2009 | Marchisio et al. |
| 2010/0036797 A1* | 2/2010 | Wong .................. G06F 16/9537 706/55 |
| 2012/0016678 A1 | 1/2012 | Gruber et al. |
| 2013/0013580 A1* | 1/2013 | Geller .................. G06F 16/285 707/706 |
| 2013/0311419 A1 | 11/2013 | Xing et al. |
| 2014/0156638 A1* | 6/2014 | Joshi ..................... G06F 16/256 707/722 |
| 2014/0324864 A1 | 10/2014 | Choe et al. |
| 2015/0120738 A1 | 4/2015 | Srinivasan |
| 2016/0048655 A1 | 2/2016 | Maitra et al. |
| 2016/0246946 A1 | 8/2016 | Haley et al. |
| 2016/0379120 A1 | 12/2016 | Merdivan et al. |
| 2017/0032025 A1 | 2/2017 | Kumar et al. |
| 2017/0329760 A1 | 11/2017 | Rachevsky |
| 2017/0357642 A1 | 12/2017 | Chapman et al. |
| 2018/0107760 A1* | 4/2018 | Saha ................. G06F 16/90344 |
| 2021/0358601 A1 | 11/2021 | Pillai et al. |

OTHER PUBLICATIONS

Li et al., "A Semantic Search Engine for Spatial Web Portals," IGARSS 2008-2008 IEEE International Geoscience and Remote Sensing Symposium, vol. 2, 2008, pp. 1278-1281.

List of IBM Patents or Patent Applications Treated as Related; (Appendix P); Date Filed: Jul. 28, 2020; 2 pages.

Miakela, "Survey of Semantic Search Research," Proceedings of the Seminar on Knowledge Management on the Semantic Web, Department of Computer Science, University of Helsinki, 2005, 11 pages.

Pinheiro et al., "An Ontology Based-Approach for Semantic Search in Portals." Proceedings of the 15th International Workshop on Database and Expert Systems Applications, IEEE, 2004, 5 pages.

Wu et al., "Falcon-S: An Ontology-Based Approach to Searching Objects and Images in the Soccer Domain." Supplemental Proceedings of ISWC (2006), pp. 1-8.

\* cited by examiner

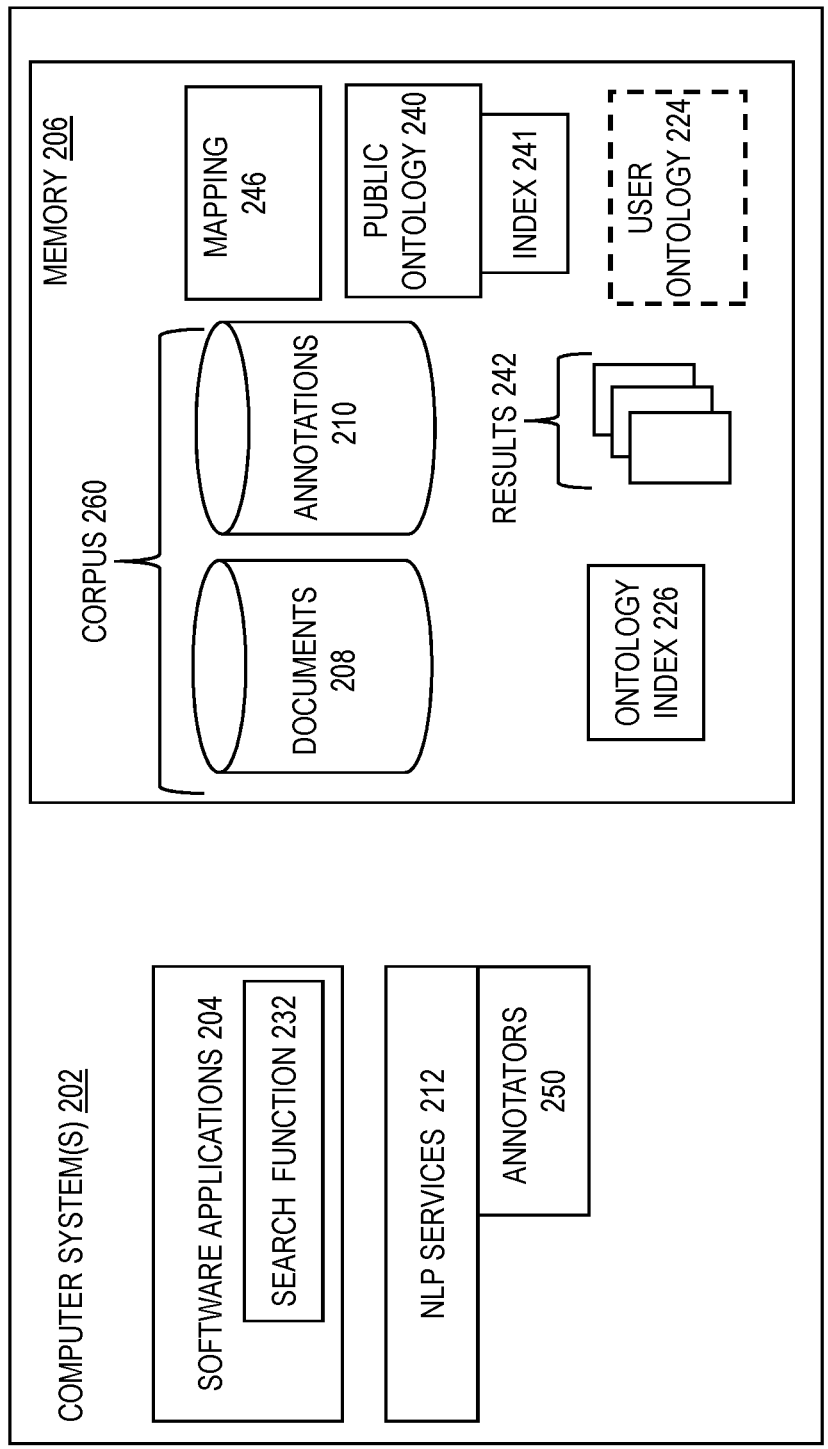

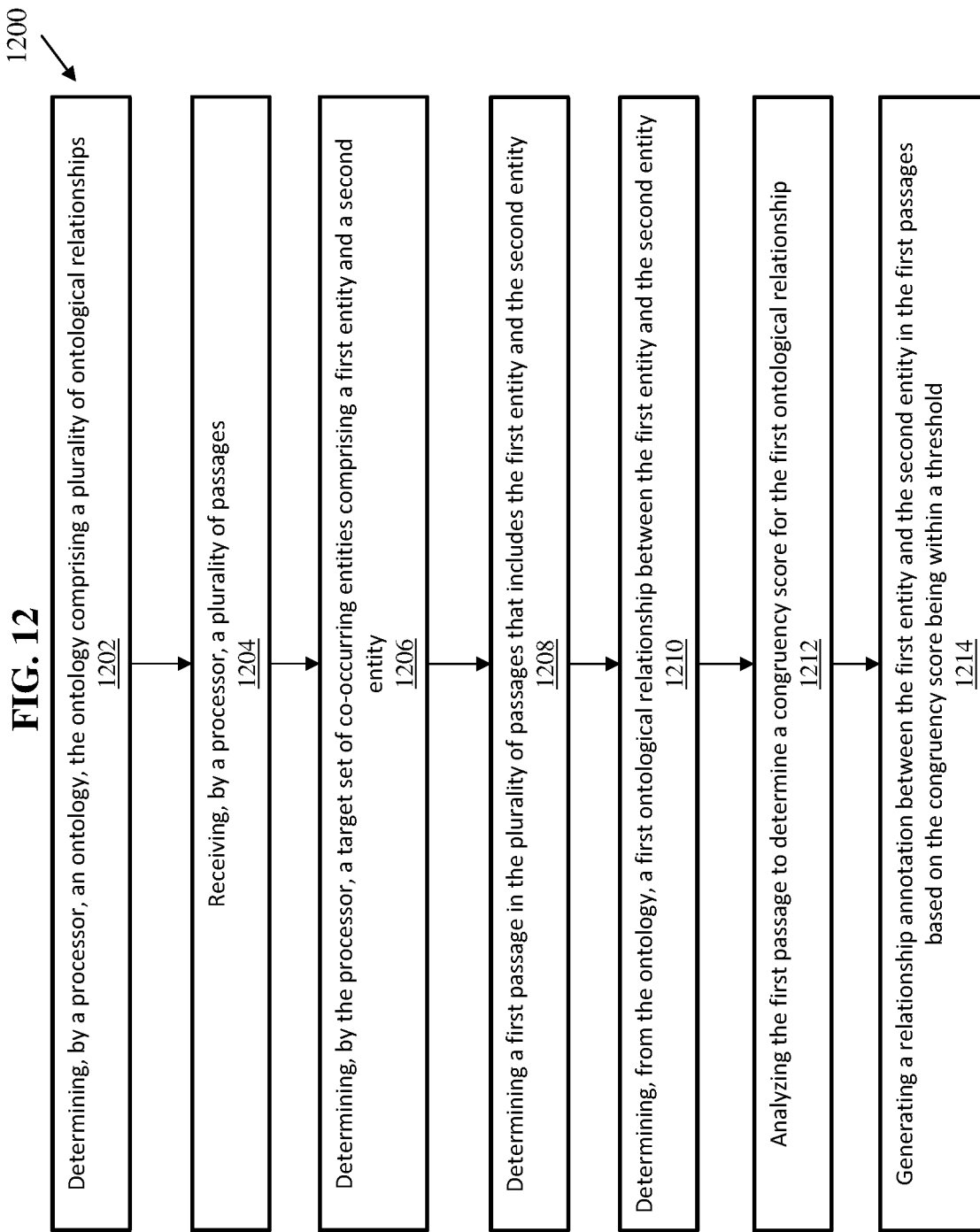

CUSTOM SEMANTIC SEARCH EXPERIENCE DRIVEN BY AN ONTOLOGY

BACKGROUND

The present invention generally relates to computer systems, and more specifically, to a custom semantic search experience driven by an ontology.

Natural language processing (NLP) is concerned with the interactions between computers and human (natural) languages and how computers process and analyze large amounts of natural language data. This natural language data is sometimes referred to as a corpus or corpora. In linguistics, a corpus or text corpus is a language resource consisting of a large and structured set of texts. NLP processing can occur on large corpora resulting in many annotations associated with the corpora. Semantic search of a corpus denotes searching with meaning, as distinguished from lexical search where the search engine looks for literal matches of the query words or variants of them without understanding the overall meaning of the query. Semantic search seeks to improve search accuracy by understanding the searcher's intent and the contextual meaning of terms as they appear in the searchable dataspace to generate more relevant results. Semantic search systems consider various points including context of search, location, intent, variation of words, synonyms, generalized and specialized queries, concept matching, and natural language queries to provide relevant search results. Some regard semantic search as a set of techniques for retrieving knowledge from richly structured data sources like ontologies. An ontology encompasses a representation, formal naming, and definition of the categories, properties, and relations between the concepts, data, and entities that substantiate one, many, or all domains of discourse. More simply, an ontology is a way of showing the properties of a subject area and how they are related, by defining a set of concepts and categories that represent the subject.

SUMMARY

Embodiments of the present invention are directed to a custom semantic search experience driven by an ontology. A non-limiting example computer-implemented method includes updating a semantic search function with a custom ontology, the semantic search function initially supporting a separate ontology having been used to enrich a corpus. The method includes using the custom ontology to augment input of a search query for the semantic search function, thereby providing a custom user experience for searching the corpus.

In addition to one or more of the features described above or below, or as an alternative, further embodiments could include where the custom ontology is different from the separate ontology.

In addition to one or more of the features described above or below, or as an alternative, further embodiments could include where the custom ontology is received from a user and is curated independently from the separate ontology.

In addition to one or more of the features described above or below, or as an alternative, further embodiments could include where using the custom ontology to augment the input of the search query for the semantic search function comprises generating suggestions associated with the input of the search query.

In addition to one or more of the features described above or below, or as an alternative, further embodiments could include where the custom user experience for searching the corpus comprises generating the suggestions using the custom ontology.

In addition to one or more of the features described above or below, or as an alternative, further embodiments could include where the custom user experience for searching the corpus comprises generating the suggestions using the custom ontology and the separate ontology.

In addition to one or more of the features described above or below, or as an alternative, further embodiments could include where the custom user experience for searching the corpus comprises generating the suggestions using the custom ontology while avoiding execution of natural langue processing (NLP) on the corpus with the custom ontology.

In addition to one or more of the features described above or below, or as an alternative, further embodiments could include where software is provided as a service in a cloud environment for providing the custom user experience for searching the corpus using the custom ontology to augment the input of the search query.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 depicts a block diagram of a system for replacing mappings within a semantic search application over a commonly enriched corpus in accordance with one or more embodiments of the present invention;

FIG. 12 depicts a flow diagram of a method for semantic linkage qualification of ontologically related entities according to one or more embodiments of the invention.

DETAILED DESCRIPTION

One or more embodiments of the present invention provide a technique of employing a user ontology for use in aiding a customized search experience over a corpus that was previously enriched with a different ontology. The user ontology is a custom ontology specific to the user as oppose to a public ontology commonly available with the corpus. As an example, one or more embodiments mimic a custom enrichment search experience without the computational cost in terms of processors, memory, time, expense, etc., of constructing and running a custom enrichment of the corpus.

Although it is recognized as challenge to provide an enriched corpus that can meet the needs of a wide variety of consumers, this is because custom enrichment of the entire corpus is a costly endeavor which requires rerunning the natural language processing (NLP) processor over the entire corpus. However, one or more embodiments deliver the benefits of a customized semantic search experience using a commonly enriched corpus without requiring the costly endeavor of rerunning the NLP processor over the entire corpus using the custom ontology. As noted herein, one or more embodiments provide the integration of a custom ontology with a semantic search user experience (e.g., typeahead) over a corpus enriched with a separate ontology, thereby affording users/consumers the ability to view a commonly enriched corpus through the lens of the custom ontology of his/her choice.

Figure 1:
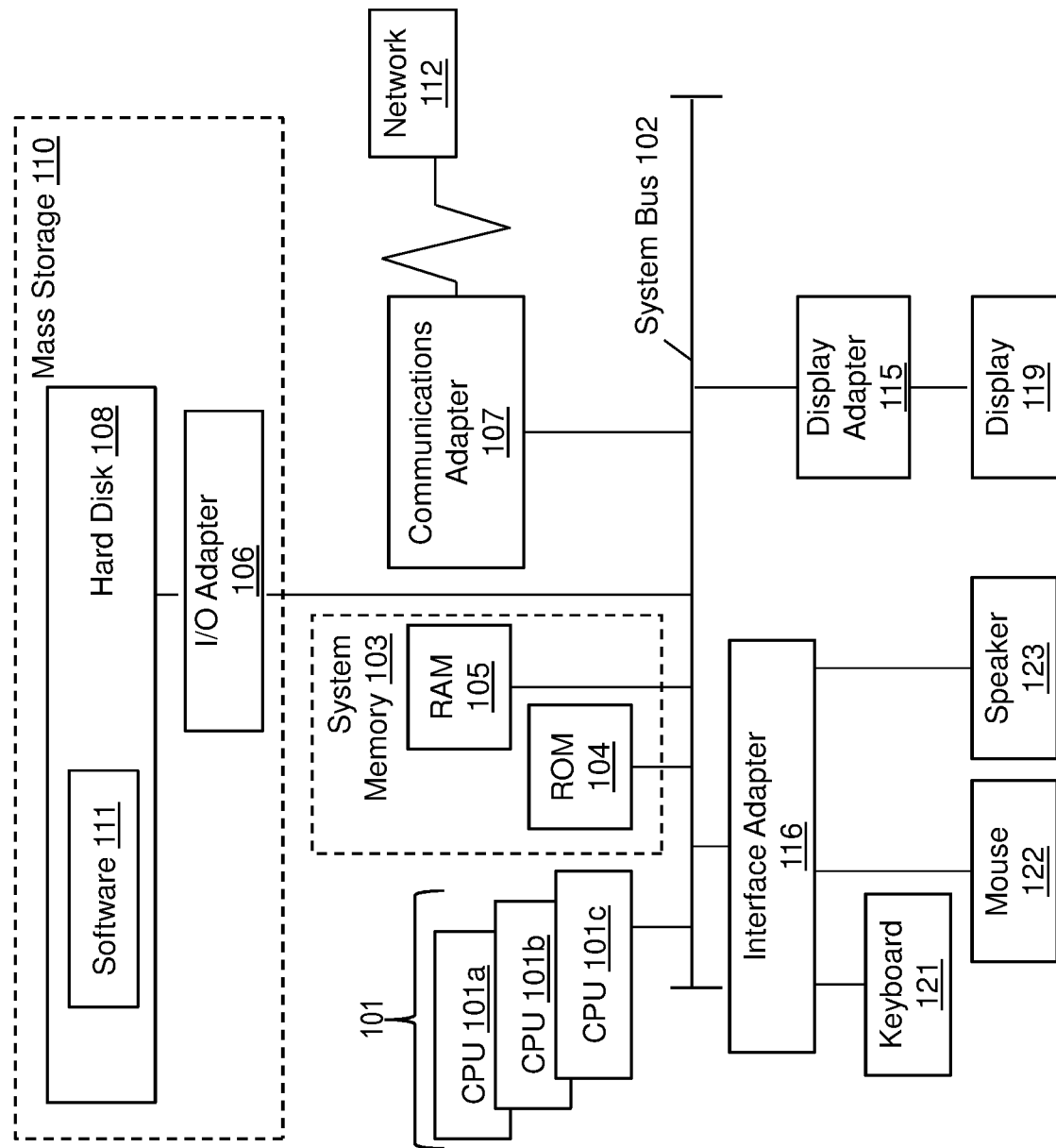
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3A:
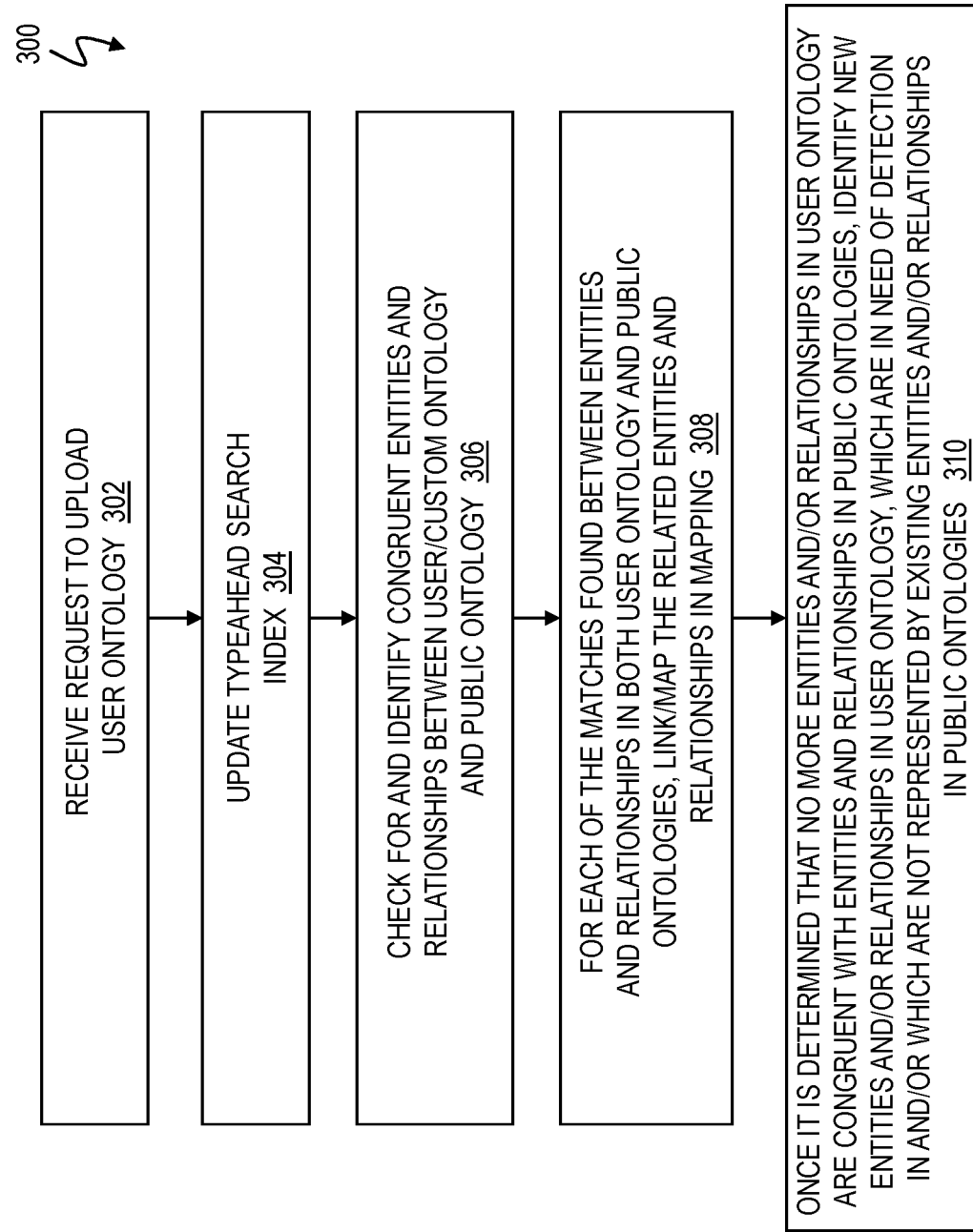
FIGS. 3A and 3B together depict a flowchart of a process for a custom semantic search experience driven by the user's ontology which includes replacing mappings within a semantic search application over a commonly enriched corpus in accordance with one or more embodiments of the present invention.
Figure 3B:
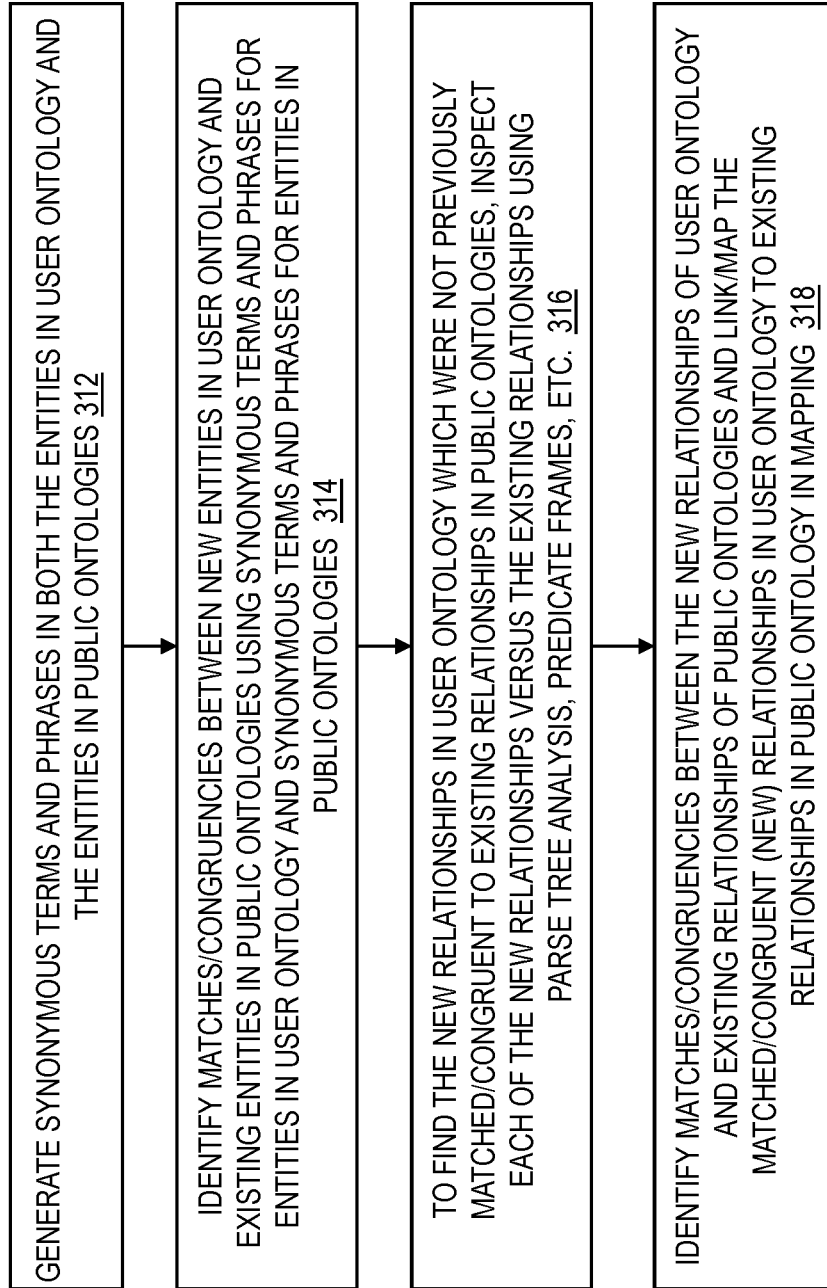

FIG. 2 is a block diagram of a system 200 for replacing mappings within a semantic search application over a commonly enriched corpus in accordance with one or more embodiments of the present invention. FIG. 2 depicts one or more computers systems 202 coupled to computer system 220. Computer systems 202 can be representative of numerous computers in a datacenter servicing various users. Computer system 220 can be representative of numerous user computers requesting customized access to resources on computer systems 202. Elements of computer system 100 may be used in and/or integrated into computers system 202 and computer system 220. FIGS. 3A and 3B illustrate a flowchart of a process 300 for a custom semantic search experience driven by the user's ontology which includes replacing mappings within a semantic search application over a commonly enriched corpus in accordance with one or more embodiments of the present invention. Process 300 in FIGS. 3A and 3B will be described with reference to FIG. 2.

At block 302, software application 204 on computer system 202 is configured to receive a request 230 for a customized semantic search from computer system 220. Computer system 220 is the system for the user, who is may also be referred to as the customer, tenant, etc. Computer system 220 can communicate with computer systems 202 over a wired and/or wireless network. Using computer system 220, the user can interface directly with software application 204 of computer system 202 and/or use a client application 222 to interface with software application 204. Software application 204 may be implemented as software 111 executed on one or more processors 101, as discussed in FIG. 1. Similarly, client application 222 may be implemented using software 111 configured to execute on one or more processors 101. Client application 222 may include cookies, plug-ins, etc., and client application 222 may serve as a piece of computer software that accesses the customized semantic search service for corpus 260 made available by computer system 202.

Corpus 260 on computer system 202 is available to the public for semantic search in which one or more ontologies 240 are used for the semantic search. Corpus 260 has been enriched by one or more natural language processing (NLP) services 212 using one or more ontologies 240. Corpus 260 includes databases of numerous documents 208 and annotations 210 about those documents 208. Corpus 260 may contain hundreds, thousands, and/or millions of documents, also referred to as "big data". In accordance with one or more embodiments, the enormous size of corpus 260 requires management, processing, and search by a machine (such as computer system 202), for example, using computer-executable instructions, and corpus 260 could not be practically managed, stored, analyzed, and/or processed as discussed herein within the human mind. For corpus 260, NLP processing via one or more NLP services 212 using annotators 250 has occurred on documents 208 resulting in annotations 210 associated with the text of documents 208. NLP services 212 used one or more ontologies 240 to generate annotations 210 thereby enriching corpus 260. Ontologies 240 represent one or more public ontologies commonly available with corpus 260. To enrich corpus 260, NLP services 212 are configured to index the documents 208, and while using the index of documents 208 along with public ontologies 240, NLP services 212 are configured to find insights and relationships in the text of documents 208 and output this information as annotations 210 (or metadata) associated with documents 208. Oftentimes, a semantic search application will provide a public, multi-tenant, enriched corpus including an ontology that maps out all the relationships between the NLP-extracted entities. "Public" with respect to the ontology means provided and available to all tenants. Embodiments of the invention enable different users (i.e., tenants) with the ability to provide their own ontologies, such that the users can each perform semantic searches based on their ontological view of the world (i.e., their own entities and relationships therein). Although software applications 204 can include a semantic search application and are able to perform a semantic search over the NLP enriched corpus 260 using public ontologies 240, software applications 204 are also configured to perform a customized semantic search using a user ontology 224 in place of and/or in addition to public ontologies 240. The user ontology 224 is a custom ontology specific/personal to the user of computer system 220 as oppose to the public ontology 240 commonly available with corpus 260. User ontology 224 was curated independently from the public ontology 240 that was leveraged for the NLP enrichment process. For example, public ontologies 240 may include entities and the relationships between those entities for medial information of general medicine. User ontology 224 may include entities and the relationships between those entities for medical information on particular specializations and disciplines of medicine, such as internal medicine, pediatrics, immunology, cardiology, etc. The request 230 includes the user ontology 224, and the request 230 may also include a search query concurrently with the user ontology 224 and/or responsive to sending user ontology 224 to computer system 202 such as after computer system 202 prompts the user to input the search query. The request 230 may include a unique identification (ID) such as a numeric ID, alphanumeric ID, a unique name, etc., which uniquely identifies corpus 260 from other corpora on computer systems 202. Software application 204 is configured to upload user ontology 224 to be associated with corpus 260 identified by the unique identification. As such, a cloned copy of user ontology 224 is stored in memory 206 and shown with dashed lines. Software application 204 may include, be integrated with, and/or call another software application tool to index user ontology 224, thereby generating user ontology index 226. The user ontology index 226 is a listing of all text/words (i.e., surface forms) in user ontology 224 along with their associated locations within user ontology 224. Each user desiring a custom semantic search experience will have his/her own user ontology index 226 correlating to his/her own user ontology 224. The user ontology index 226 is a database index and/or other search index (i.e., Lucene or elastic search index) which allow for quick look-up by a typeahead search function 232 (including software application 204). In one or more embodiments, the ontology index 226 can be a Lucene-style index that is searched using a Lucene-style query. Lucene is an inverted full-text index. This means that it takes all the documents, splits them into words, and then builds an index for each word. Since the index is an exact string-match, the query can be very fast.

Figure 7:
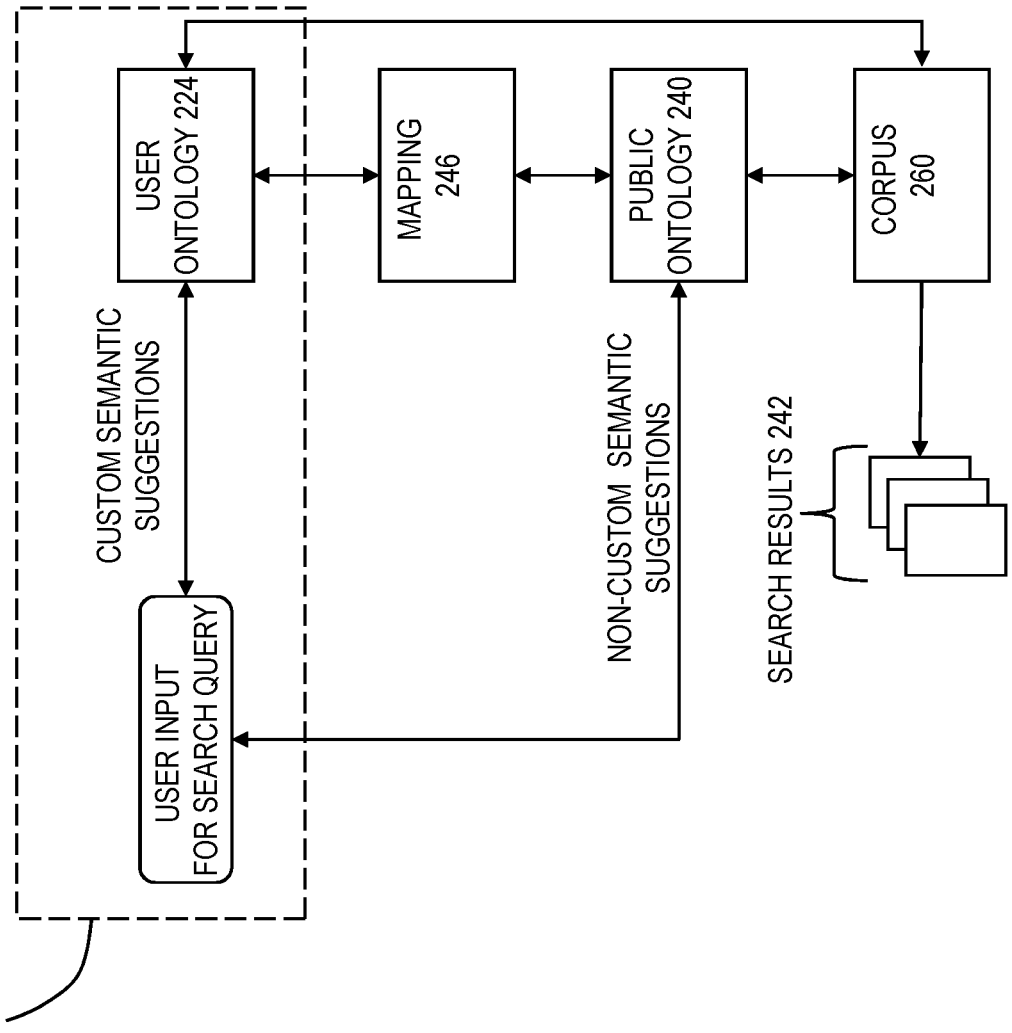
FIG. 7 depicts a block diagram of providing custom semantic suggestions from a user ontology concurrent with user input for a search query in accordance with one or more embodiments of the present invention.

At block 304, software application 204 on computer system 202 is configured to update the typeahead search function 232 with user ontology 224, particularly user ontology index 226. The typeahead search function 232 is updated to use ontology index 226 in place of and/or in addition to an index 241 of public ontologies 240. Software application 204 may include, be integrated with, and/or call typeahead search function/application 232. Typeahead search or simply typeahead, which is also known as autocomplete or autosuggest, is a language prediction tool used to predict and provide suggestions for users as they type in a search query using, for example, a search index such as user ontology search index 226. By updating the typeahead search function 232 with user ontology 224 particularly the ontology index 226, as the user types his/her search query, software application 204 is configured to autocomplete and autosuggest terms and/or phrases based on entities and relationships in user ontology 224 in place of entities and relationships in public ontologies 240 and/or in addition to public ontologies 240. The suggested terms and/or phrases will be specific and unique to user ontology 224 each time the user begins entering a search query to search enriched public corpus 260 on computer system 202. In one or more embodiments, FIG. 7 depicts a block diagram of software application 204 providing custom semantic suggestions from user ontology 224 concurrent with user input for a search query, such that the suggestions are displayed/rendered for display to the user as he/she types in the search query. In one or more embodiments, custom semantic suggestions are provided from user ontology 224, along with non-custom semantic suggestions from public ontologies 240 having been used to enrich corpus 260; the non-custom semantic suggestions from public ontologies 240 would have been used exclusively if the custom semantic search experience were not supported.

Returning to FIGS. 3A and 3B, at block 306, software application 204 on computer system 202 is configured to check whether any entities and relationships in user ontology 224 are congruent with entities and relationships in public ontologies 240, as part of mapping. In one or more embodiments, software application 204 is configured to find and identify entities and relationships in user ontology 224 which match entities and relationships in public ontologies 240. In one or more embodiments, congruent entities and relationships in user ontology 224 and public ontologies 240 can be found by using various techniques. To find congruent entities, common techniques to identify the degree of text similarity between words and phrases may be employed by software application 204, such as cosine similarity, Euclidean distance, Jaccard distance, word movers distance, etc., over a vector representation of the text (e.g., word embedding model). The entities being evaluated for similarity are the entities between the public/provided ontology and the user-provided ontology. Some entities can be mapped between the two ontologies (i.e., the same concept exists in both), but some entities in the user ontology may not be represented in the public/provided ontology, thereby requiring additional entity detection to be performed in that instance based on the seed entity name(s) in the user ontology and common concept expansion techniques performed therein to identify word variations of this new entity that are not represented in the public/provided ontology or the supported NLP annotators behind the public/provided ontology. With regard to finding congruent relations (similar to finding congruent entities), relations in the public/provided ontology are mapped to the user ontology where applicable, but in cases where relations in the user-provided ontology are not represented in the public/provided ontology, additional relation detection may be used to support these new user-provided relations employed for semantic search over a corpus. To detect new relations expressed in the user-provided ontology, relation names are first broken down into valid words or tokens, for example, "mayTreat" is split into "may treat" (2 words/tokens). This type of pre-processing is performed as necessary to arrive at a natural language phrase that can be used to evaluate against intervening parse tree nodes between co-occurring entities as detailed in FIG. 11 (herein). The ontology informs the software application 204 as to which entities are eligible/applicable for a given relation, so that software application 204 is not blindly matching every co-occurring entity against every possible relationship, rather just the eligible candidate relations based on the co-occurring entities that have an expressed relationship within the ontology. For each of the matches found between entities and relationships in both user ontology 224 and public ontologies 240, software application 204 is configured to link/map these related entities and relationships in mapping 246 at block 308.

Once software application 204 determines that no more entities and/or relationships in user ontology 224 are congruent with entities and relationships in public ontologies 240, software application 204 on computer system 202 is configured to identify new entities and/or relationships in user ontology 224, which are in need of detection in and/or which are not represented by existing entities and/or relationships in public ontologies 240 at block 310. To find the new entities in user ontology 224 which were not previously matched/congruent to existing entities in public ontologies 240, software application 204 on computer system 202 is configured to generate synonymous terms and phrases in both the entities in user ontology 224 and the entities in public ontologies 240 at block 312. At block 314, software application 204 on computer system 202 is configured to identify matches/congruences between new entities in user ontology 224 and existing entities in public ontologies 240 using, for example, synonymous terms and phrases for entities in user ontology 224 and synonymous terms and phrases for entities in public ontologies 240. Once the matches and/or congruences are found between entities in user ontology 224 and public ontology 240, software application 204 is configured to link/map (new) entities in user ontology 224 to existing entities in public ontology 240 in mapping 246. Software application 204 can include, use, and/or call a combination of various software application tools to identify and find matches and/or congruences between entities in user ontology 224 and public ontology 240.

For example, software application 204 may include functionality of and/or use one or more software application tools (such as, e.g., WordNet®) having lexical databases of semantic relations between words. The software application tool links words into semantic relations including synonyms, hyponyms, and meronyms. The synonyms can be grouped into synsets with short definitions and usage examples. The software application tool can be a combination and extension of a dictionary and thesaurus. The software application tool can use automatic text analysis and artificial intelligence. Additionally, software application 204 may include functionality of and/or use one or more software application tools for word embedding. Word embedding is the collective name for a set of language modeling and feature learning techniques in natural language processing (NLP) where words or phrases from the vocabulary are mapped to vectors of real numbers. Word embedding may involve mathematical embedding from a space with many dimensions per word to a continuous vector space with a much lower dimension. Methods to generate this mapping include neural networks, dimensionality reduction on the word co-occurrence matrix, probabilistic models, explainable knowledge base method, and explicit representation in terms of the context in which words appear.

At block 316, to find the new relationships in user ontology 224 which were not previously matched/congruent to existing relationships in public ontologies 240, software application 204 on computer system 202 is configured to inspect each of the new relationships versus the existing relationships using parse tree analysis, predicate frames, etc., in addition to using the software application tools discussed above for lexical databases of semantic relations between words and word embedding. At block 318, software application 204 on computer system 202 is configured to identify matches/congruences between the new relationships of user ontology 224 and existing relationships of public ontologies 240 and link/map the matched/congruent (new) relationships in user ontology 224 to existing relationships in public ontology 240 in mapping 246. In addition to employing user ontology index 226, the typeahead search function 232 is updated with and/or linked to mapping 246 to take advantage of the matches/congruences in entities and relationships between user ontology 224 and entities and relationships in public ontologies 240. Since the links and connections in mapping 246 are associated with terms (i.e., entities and relationships) of user ontology 224, this allows a seamless customized search experience over corpus 260 for the user of computer system 220 based on his/her own user ontology 224 in place of and/or in addition to public ontology 240. Further, software application 204 can utilize one or more portions of annotations 210 when performing blocks 312, 314, 316, and 318. According to one or more embodiments, all or part of one or more processes in blocks 312, 314, 316, and 318 may be performed using any part of the examples discussed in FIGS. 10-12 below in order to find matches/congruences between entities and/or relationships in user ontology 224 and public ontology 240 for block 310 (e.g., for the new entities and/or relationships in user ontology 224 which are in need of detection in and/or which are not (initially) found to be represented by existing entities and/or relationships in public ontology 240).

Figure 4:
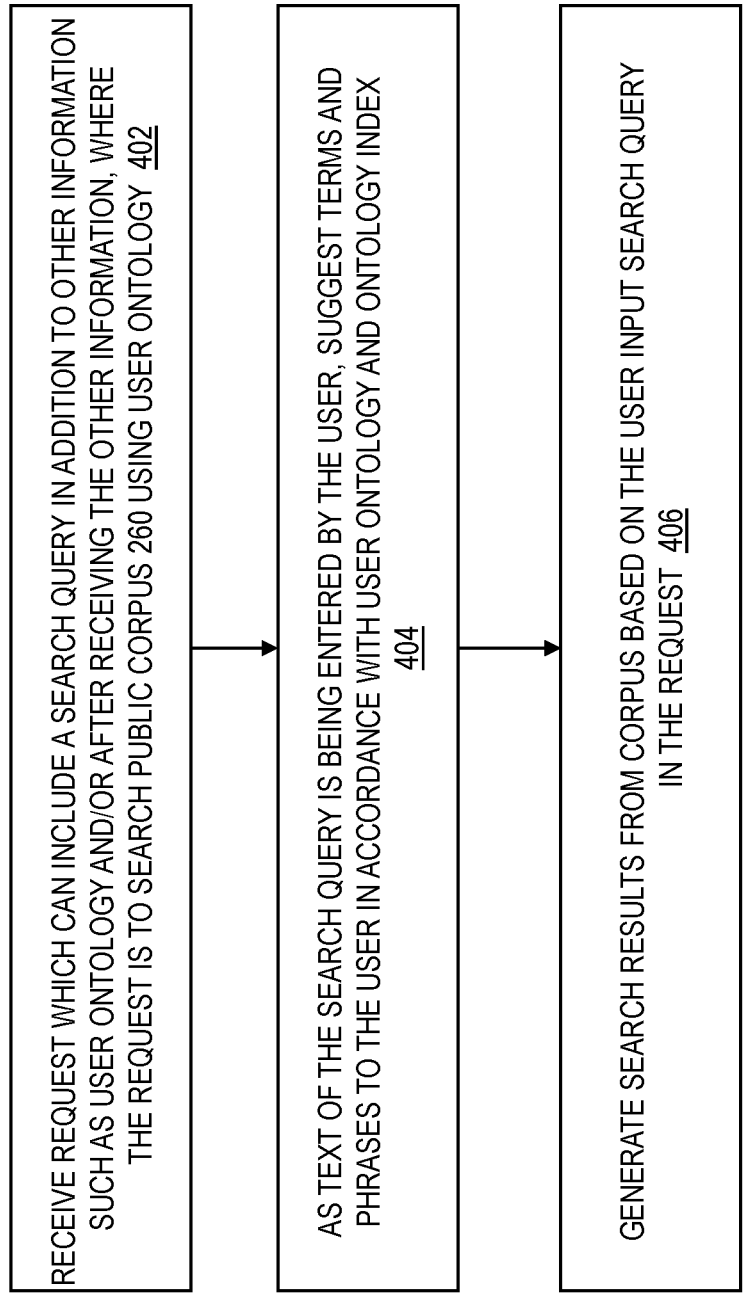
FIG. 4 is a flowchart of a process for a custom semantic search experience driven by the user's ontology over a commonly enriched corpus continuing from, responsive to, and/or concurrent with the process in FIGS. 3A and 3B in accordance with one or more embodiments of the present invention.

FIG. 4 is a flowchart of a process 400 for a custom semantic search experience driven by the user's ontology over a commonly enriched corpus 260 which continues from, is responsive to, and/or concurrent with process 300 discussed in FIGS. 3A and 3B in accordance with one or more embodiments of the present invention. Although not explicitly shown in FIG. 4, one or more blocks in process 400 of FIG. 4 can be simultaneously and/or nearly simultaneously processed with one or more blocks in FIGS. 3A and 3B. At block 402, software application 204 is configured to receive request 230 which can further include a search query (such as the search query depicted in FIG. 7) in addition to and/or after receiving other information such as user ontology 224 discussed herein, where the request 230 is for custom semantic search experience to search public corpus 260 using user ontology 224. The corpus 260 has been enriched by a separate public ontology 240 different from user ontology 224. As text of the search query is being entered by the user of computer system 220, for example, using client application 222 coupled to software application 204 and/or directly using software application 204, software application 204 using typeahead search function 232 is configured to suggest terms and phrases to the user in accordance with user ontology 224 and user ontology index 226 at block 404. For example, FIG. 7 illustrates that software application 204 can display custom semantic suggestions from user ontology 224 to the user solely and/or along with non-custom semantic suggestions from public ontologies 240. At block 406, software application 204 is configured to generate search results 242 from corpus 260 based on the user input search query in request 230. As depicted in FIG. 7, software application 204 can utilize mapping 246 to map/link search terms in the user search query corresponding to user ontology 224 back to public ontologies 240 when searching corpus 260, and/or software application 204 can search for one or more search terms of user search query in corpus 260 without mapping back to public ontologies 240. The search results 242 from the semantic search of corpus 260 are displayed/rendered to the user and transmitted from computer system 202 to the user on computer system 220.

As technical advantages and benefits, one or more embodiments mimic a custom enrichment search experience without the computational cost (in terms of processors, memory, time, expense, etc.) of constructing and running a custom enrichment of the corpus which would include rerunning the NLP service/NLP processor over the entire corpus. Therefore, one or more embodiments offer a customized semantic search experience using the commonly enriched corpus 260 by integrating the user (custom) ontology 224 with a semantic search user experience (e.g., typeahead search function 232) over corpus 260 having been previously enriched with the separate public ontology 240, thereby affording users/consumers the ability to view a commonly enriched corpus through the lens of the custom ontology of his/her choice.

Further technical advantages and benefits allow multiple users to each apply their own ontologies (e.g., although one user ontology 224 for a particular user is illustrated in FIG. 2, user ontology 224 is representative of numerous custom ontologies for respective users in which each user can individually apply his/her own ontology to the corpus 260 as discussed herein) to a public corpus 260 enriched by the common public ontology 240 for the purposes of users being able to construct their own semantic search queries based on the constructs they have defined in their own ontology. One or more embodiments allow multiple users to apply one or more of their own ontologies for the purpose of semantically searching a public corpus through their point of view (ontology), thereby avoiding and not requiring a custom enriched corpus per ontology, which would be prohibitively computational expensive in terms of processors, memory, bandwidth, etc., and time consuming. By supporting multiple custom ontologies over the public shared corpus 260, system 200 is configured to individually customize the semantic search experience for each customer. In system 200, custom user ontologies are explicit, thereby being defined within the user ontology itself rather than a query that mimics the association. One or more embodiments provide the ability to customize the entities as well as the associations (relations/relationships) between those entities, again explicitly through a custom ontology itself rather than mimicking the behavior via a query.

Figure 5:
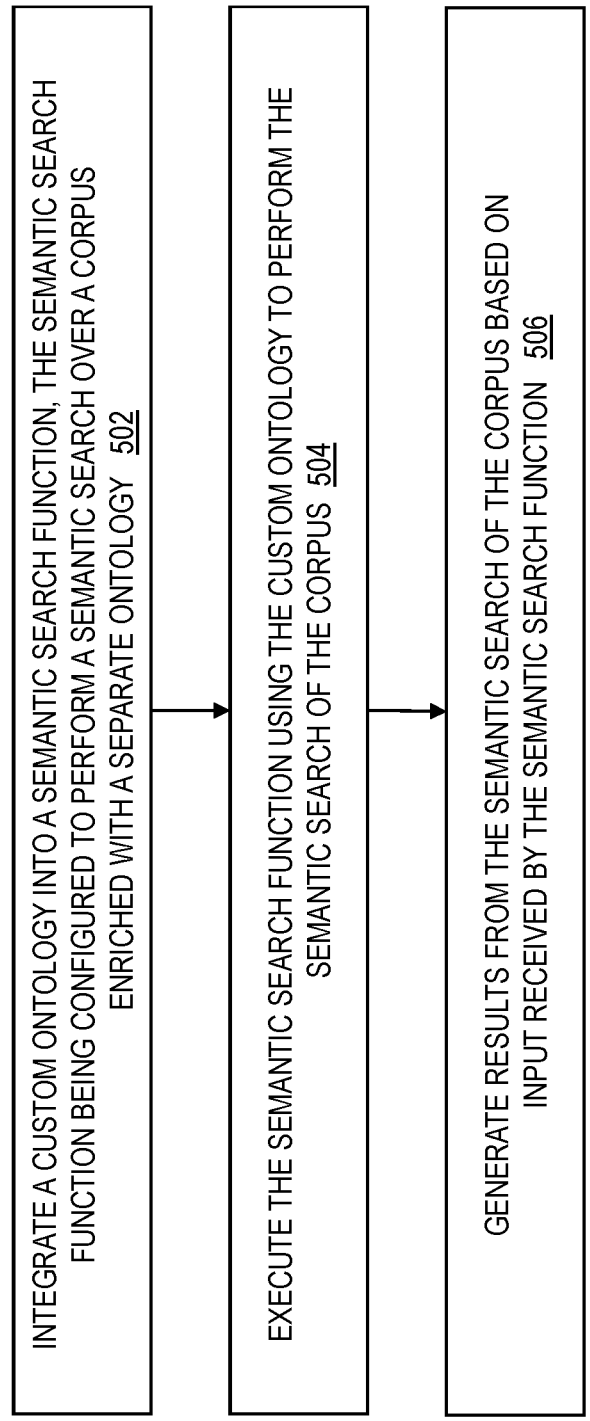
FIG. 5 is a flowchart of a computer-implemented method employing a user ontology to support a customized search experience over a corpus that was enriched with a different ontology in accordance with one or more embodiments of the present invention.

FIG. 5 is a flowchart of a computer-implemented method 500 employing a user ontology for use in aiding a customized search experience over a corpus that was enriched with a different ontology in accordance with one or more embodiments of the present invention. At block 502, software application 204 is configured to integrate a custom ontology (e.g., user ontology 224) into a semantic search function (e.g., typeahead search function 232), the semantic search function being configured to perform a semantic search over a corpus 260 enriched with a separate ontology 240. At block 504, software application 204 is configured to execute the semantic search function using the custom ontology (e.g., user ontology 224) to perform the semantic search of the corpus 260. For example, software application 204 is configured to parse corpus 260 and semantically search for terms in the search query from the user while using user ontology 224, without requiring additional NLP processing by NLP services 212 with user ontology 224. At block 506, software application 204 is configured to provide/generate search results 242 from the semantic search of the corpus 260 based on user input (e.g., from computer system 220) received by the semantic search function on computer system 202.

The semantic search function uses a typeahead search function 232 associated with the custom ontology (e.g., user ontology 224). The semantic search function uses a typeahead search function 232 to generate and display suggestions based on the custom ontology (e.g., user ontology 224) as an alternative to the separate ontology 240. The semantic search function uses a typeahead search function 232 to generate and display suggestions based on the custom ontology (e.g., user ontology 224) in addition to the separate ontology 240.

The separate ontology 240 is used to explicitly enrich the corpus 260. Software application 204 is configured to index the custom ontology (e.g., user ontology 224). The semantic search function uses the user ontology index 226 of the custom ontology (e.g., user ontology 224) to generate suggestions for a user entering the input (via computer system 220 into computer system 202) as a search query. Integrating the custom ontology (e.g., user ontology 224) into the semantic search function (e.g., typeahead search function 232) comprises determining congruences (which are linked/mapped in mapping 246) between entities and relationships in the custom ontology and the separate ontology (e.g., public ontology 240), the semantic search function (e.g., typeahead search function 232) employing the congruences (via mapping 246) to support the input received by the semantic search function. The integrating and the executing enable unilaterally provisioning computing capabilities for providing a customized search experience over the corpus 260 that was enriched with the separate ontology 240 different from the custom ontology (e.g., user ontology 224).

Figure 6:
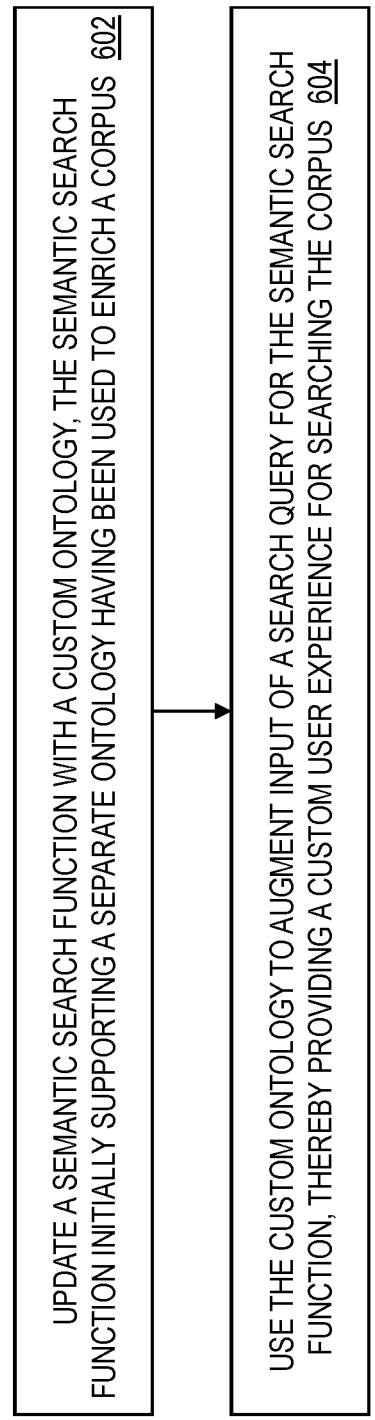
FIG. 6 is a flowchart of a computer-implemented method for a custom semantic search experience driven by a user ontology in accordance with one or more embodiments of the present invention.

FIG. 6 is a flowchart of a computer-implemented method 600 a custom semantic search experience driven by an ontology in accordance with one or more embodiments of the present invention. At block 602, software application 204 is configured to update a semantic search function (e.g., typeahead search function 232) with a custom ontology (e.g., user ontology 224), the semantic search function initially supporting a separate ontology (e.g., public ontology 240) having been used to enrich a corpus 260. At block 604, software application 204 is configured to use the custom ontology (e.g., user ontology 224) to augment input of a search query for the semantic search function, thereby providing a custom user experience for searching the corpus 260.

The custom ontology (e.g., user ontology 224) is different from the separate ontology (e.g., public ontology 240). The custom ontology is received by computer system 202 from a user using computer system 220 and is curated independently from the separate ontology. Using the custom ontology to augment the input of the search query for the semantic search function comprises generating suggestions associated with the input of the search query. The custom user experience for searching the corpus 260 includes generating the suggestions using the custom ontology (e.g., custom semantic suggestions using user ontology 224). The custom user experience for searching the corpus 260 includes generating the suggestions using the custom ontology (e.g., custom semantic suggestions specific to user ontology 224) and the separate ontology (e.g., non-custom semantic suggestions specific to public ontology 240). The custom user experience for searching the corpus 260 includes generating the suggestions using the custom ontology while avoiding performing/execution of natural langue processing (NLP) (via NLP services 212) on the corpus 260 with the custom ontology (e.g., user ontology 224). Software is provided as a service in a cloud environment for providing the custom user experience for searching the corpus 260 using the custom ontology to augment the input of the search query.

Figure 10:
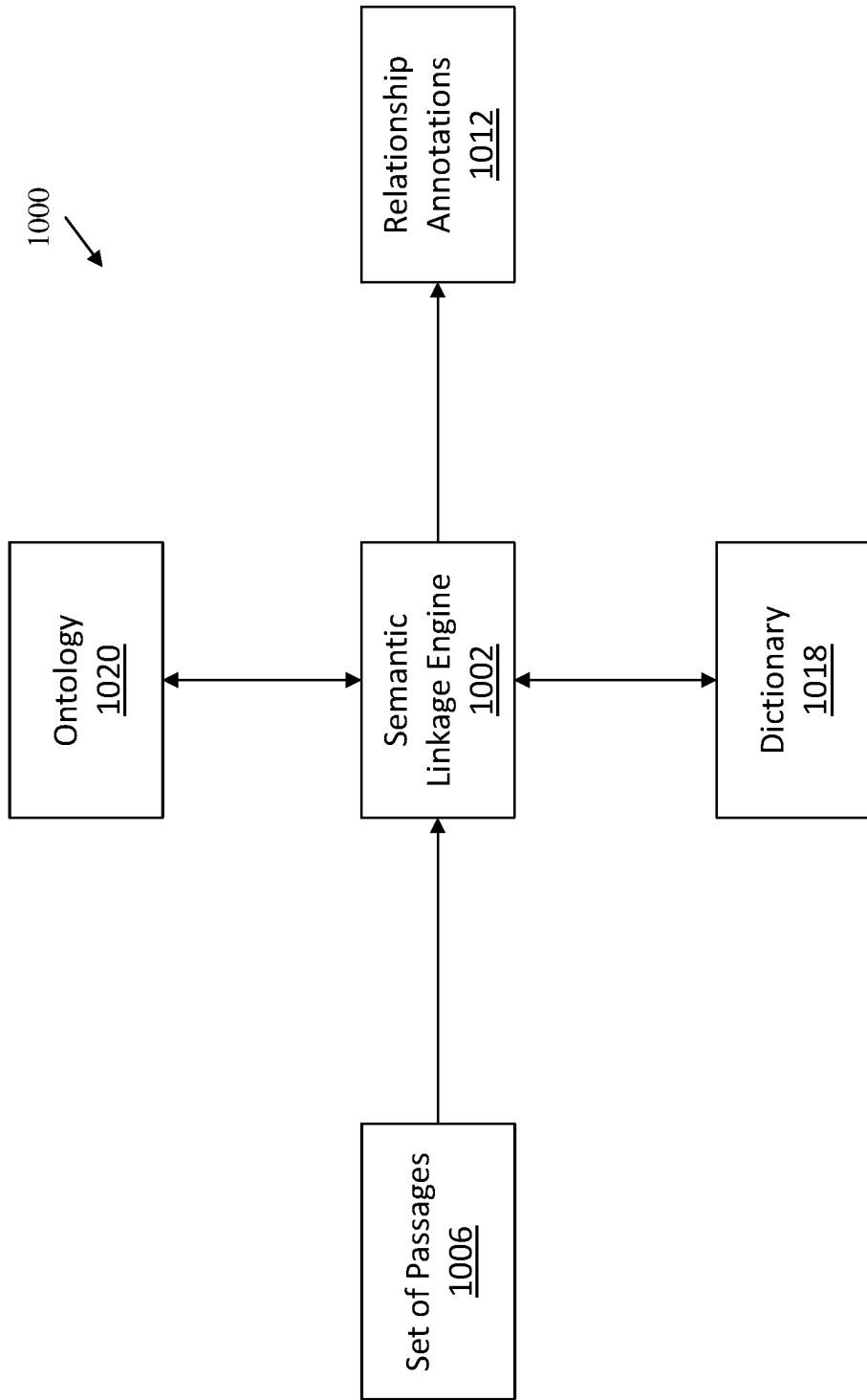
FIG. 10 depicts a system for semantic linkage qualification of ontologically related entities according to one or more embodiments of the present invention.

One or more embodiments of the invention provide a relation annotator that produces relation annotations between co-occurring entities linked within an ontology. This annotator evaluates a passage where two ontologically linked entities co-occur to determine whether there exist any semantic linkages within the passage that are congruent with the relationship expressed within the ontology. That is to say, the surrounding neighborhood within a passage, document, and the like are analyzed to determine whether the ontological relation annotation can be confirmed by the existing words and phrases in the surrounding neighborhood of the co-occurring entities. FIG. 10 depicts a block diagram of a system for semantic linkage qualification of ontologically related entities according to one or more embodiments of the present invention. It is expected that any new entities and/or relationships in user ontology 224 will be detected and/or found to be represented by existing entities and/or relationships in public ontology 240 as discussed above in FIG. 3. Further, to assist with processes performed in blocks 312, 314, 316, and 318 such as, for example, when one or more new entities and/or relationships in user ontology 224 may not have been (initially) detected and/or found to be represented by existing entities and/or relationships in public ontology 240, system 1000 may be utilized as discussed herein. One or more software applications 204 on computer system 202 can be utilized to execute and process functions/processes discussed in FIGS. 10-12 and/or call other software applications to execute and process functions/processes discussed in FIGS. 10-12.

Referring to FIG. 10, the system 1000 includes a semantic linkage engine 1002 that is configured and operable to analyze a set of passages 1006 (e.g., the passages 1006 include/correspond to the new entities and/or relationships in user ontology 224 which are in need of detection in and/or which are not (initially) found to be represented by existing entities and/or relationships in public ontology 240; also, the set of passages 1006 include/correspond to passages (e.g., existing entities and/or relationships) in public ontology 240) and utilize either an existing ontology 1020 or a defined ontology having ontological relationship annotations for existing entities/concepts that are of interest. The ontology 1020 is an ontology different from user ontology 224 and public ontology 240 but accessed by computer system 202. The ontology 1020 may be stored on and/or coupled to computer system 202. Computer system 202 may access ontology 1020 over a network such as the Internet and/or an intranet. The semantic linkage engine 1002 is further configured and operable to generate relationship annotations 1012 for co-occurring entities that exists in passages in the set of passages 1006. These relationship annotations 1012 are generated as a confirmation of the ontological relationship annotation from the ontology 1020 after a semantic analysis is performed on the passage to determine a congruency score between the ontological relationship and the other words, phrases, entities, and concepts found in the passage. In one or more embodiments of the invention, the passages described herein are natural language text and can vary in size and subject matter. For ease of description, the subject matter will be described herein for usage in the medical field, but this is not intended to limit the scope of the present invention to this field.

In one or more embodiments of the invention, pre-processing of the set of passages 1006 can occur prior to analysis by the semantic linkage engine 1002 utilizing a dictionary 1018 or set of dictionaries. This pre-processing can include, but is not limited to, entity detection which can identify and define entities/concepts that exist in the set of passages 1006 that are relevant. The entity detection can be performed utilizing techniques such as machine-learned or rule-based entity detection annotators. The semantic linkage engine 1002 can automatically or through operation by a domain expert identify co-occurring entities having an ontological relation defined by the ontology 1020 that are of interest to the domain expert. For example, co-occurring entities could be a diagnosis and an associated medication with an ontological relation being defined as treatment or prescription. As mentioned before, the pre-processing can perform entity detection to determine passages that have the exemplary co-occurring entities. The other words and phrases in the passage can be analyzed to determine a congruency for these words and phrases in the passage using semantic analysis. Semantic analysis refers to measuring contextual similarity between words and phrases in a passage. The semantic analysis is performed by the semantic linkage engine 1002. During an analysis of a passage, the semantic linkage engine 1002 can determine a congruency score between an ontological relation and the words and phrases in the passage. This congruency score can be compared to a pre-defined threshold to either confirm or reject the ontological relation taken from the ontology 1020. If confirmed (i.e., the congruency score exceeds the threshold), the semantic linkage engine 1002 can generate a relation annotation for the co-occurring entities in the passage and apply this relation annotation to the passage.

Figure 11:
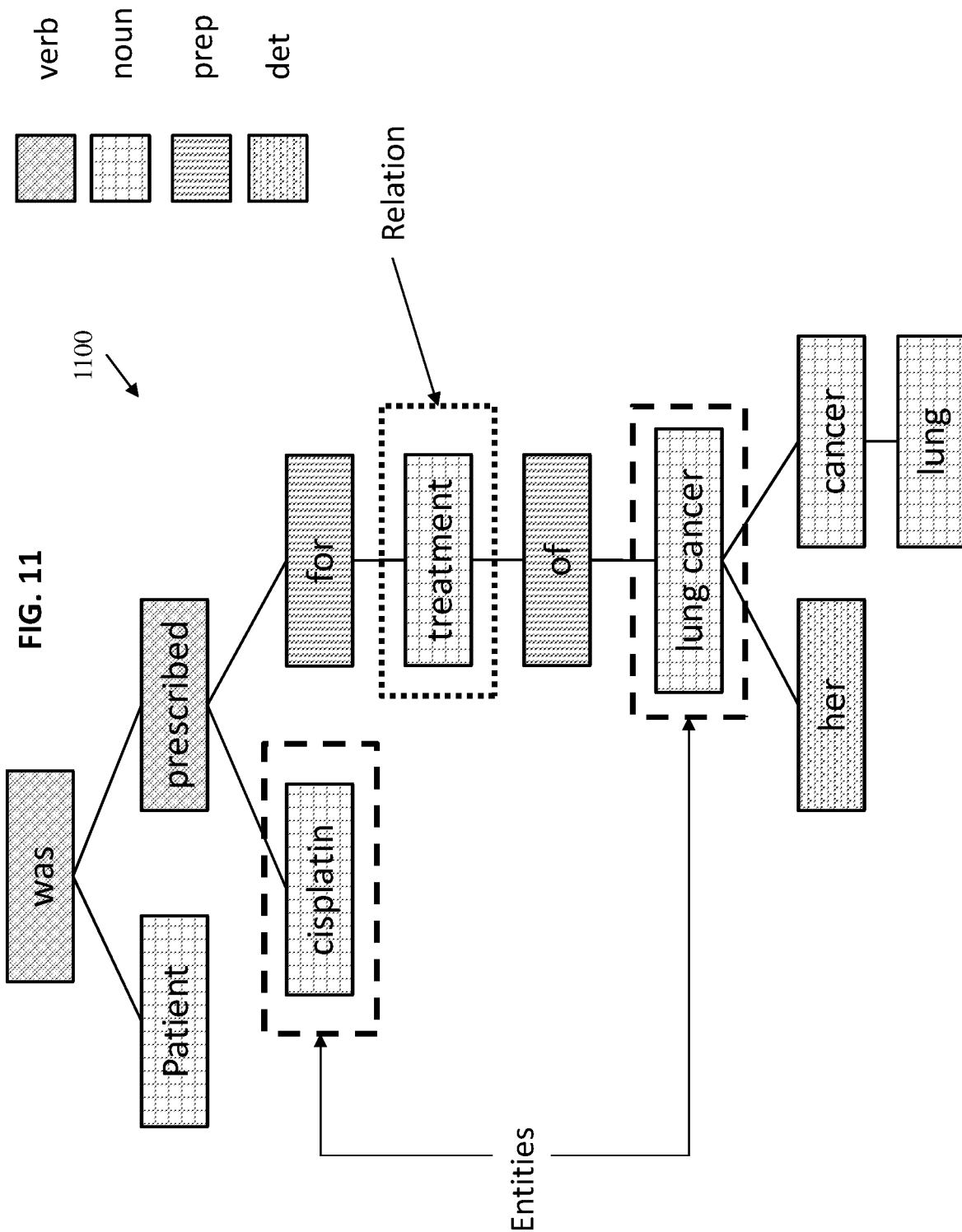
FIG. 11 depicts a block diagram representation of a parse tree for an exemplary passage according to one or more embodiments of the invention.

Semantic analysis can include parsing rules. FIG. 11 depicts a block diagram representation of a parse tree for an exemplary passage according to one or more embodiments of the invention. In the parse tree 1100 there is an exemplary passage that states, "Patient was prescribed cisplatin for treatment of her lung cancer." The parse tree 1100 parse the exemplary sentence into nodes representing either words or phrases (e.g., patient, lung cancer, etc.). The nodes are in a hierarchical structure and delineated by parts of speech (i.e., verb, noun, prepositional phrase, and determiner). In the exemplary passage, the two co-occurring entities are cisplatin (entity 1) and lung cancer (entity 2). The ontological relation for these two co-occurring entities can be "treats" and "prescribedfor". The ontology may store these ontological relations in the following format: <ENTITY1>-<RELATION>-<ENTITY2>. With that, the two co-occurring entities would show as Cisplatin-Treats-Lung Cancer and Cisplatin PrescribedFor-Lung Cancer. Not that PrescribedFor is an ontological relation which can be further broken down into "Prescribed For" or simply "Prescribed." For the exemplary passage, a semantic analysis can be performed to determine that the ontological relations are congruent with the words and phrases of the passage. This can be performed using a variety of techniques including, but not limited to, any suitable vector formation and clustering technique to represent each training/validation set phrase in vector form and then determine a similarity or grouping of different vectors, such as by using a neural network language model representation techniques (e.g., Word2Vec, Doc2Vec, or similar tool) to convert words and phrases to vectors which are then input to a clustering algorithm to place words and phrases with similar meanings close to each other in a Euclidean space. The intervening nodes of the parse tree 1100 constitute a set of tokens or words that can then be matched against the relation name, which may constitute one or more other words. Relation names such as "mayTreat" can be pre-processed to isolate the unique tokens/words therein. Now we have two sets of text (1. Intervening tokens from co-occurring entities in the passage) and (2. Tokens from the relation name), with which to analyze the degree of congruency or meaning. Techniques such as word movers distance, cosine similarity, and the like can be employed to assess the degree of similarity between the two text excerpts. Furthermore, stop words may be removed to reduce noise and polarity may be explicitly factored in as a penalty to the score—'polarity' in the sense that a token or word is negated in one set of text, but not the other (thus, the text may be highly similar, but the presence of the term 'no' can drastically change the meaning).

In one or more embodiments of the invention, the semantic linkage engine 1002 can be implemented on the processing system 100 found in FIG. 1. The processing steps described with reference to the elements of FIG. 10 can be performed utilizing the processing system 100 in FIG. 1. Additionally, the cloud computing system 10 can be in wired or wireless electronic communication with one or all of the elements of the system 1000. Cloud 50 (discussed below) can supplement, support or replace some or all of the functionality of the elements of the system 1000. Additionally, some or all of the functionality of the elements of system 1000 can be implemented as a node 10 (shown in FIGS. 8 and 9) of cloud 50. Cloud computing node 10 is only one example of a suitable cloud computing node and is not intended to suggest any limitation as to the scope of use or functionality of embodiments of the invention described herein.

In embodiments of the invention, the semantic linkage engine 1002 can also be implemented as so-called classifiers (described in more detail below). In one or more embodiments of the invention, the features of the various engines/classifiers (1002) described herein can be implemented on the processing system 100 shown in FIG. 1, or can be implemented on a neural network (not shown). In embodiments of the invention, the features of the engines/classifiers 1002 can be implemented by configuring and arranging the processing system 100 to execute machine learning (ML) algorithms. In general, ML algorithms, in effect, extract features from received data (e.g., inputs to the engines 1002) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 1002 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 1002 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 1000 can be implemented using the processing system 100 applies.

The semantic linkage engine 1002 can perform natural language processing (NLP) analysis techniques on the sets of passages 1006 which are composed of natural language text. NLP is utilized to derive meaning from natural language. The semantic linkage engine 1002 can analyze the set of passages 1006 by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized by the semantic linkage engine 1002 to determine congruency between words and phrases in a passage. These NLP structures include a translation and/or interpretation of the natural language input, including synonymous variants thereof. The semantic linkage engine 1002 can analyze the features to determine a context for the features. NLP analysis can be utilized to extract attributes (features) from the natural language. These extracted attributes can be analyzed by the semantic linkage engine 1002 to determine a congruency score and compare this score to a pre-defined threshold to determine whether to generate a relation annotation for the passage being analyzed.

FIG. 12 depicts a flow diagram of a method for semantic linkage qualification of ontologically related entities according to one or more embodiments of the invention. The method 1200 includes determining, by a processor, an ontology, the ontology comprising a plurality of ontological relationships, as shown in block 1202. Determining includes receiving an ontology or creating an ontology that defines ontological relationships between entities of interest to a domain expert. The ontological relationships are chosen to be easily associated with the subject matter of the application of this method. For example, in the medical field, utilizing certain terms or jargon for the defined ontological relationships in the ontology assists with applying it to natural language passages being analyzed. The method 1200, at block 1204, includes receiving, by a processor, a plurality of passages. As noted above, the plurality of passages can be natural language text of a given subject matter or can be any natural language text depending on the scope of the ontology. At block 1206 of the method 1200, the method 1200 includes determining, by the processor, a target set of co-occurring entities comprising a first entity and a second entity. The target co-occurring entities can be determined by a domain expert that is interested in these entities and looking to apply annotations for these entities. Also, at block 1208, the method 1200 includes determining a first passage in the plurality of passages that includes the first entity and the second entity. The first passage can be a sentence, paragraph, and document based on the application. The method 1200, at block 1210, includes determining, from the ontology, a first ontological relationship between the first entity and the second entity. Also, the method 1200, at block 1212, includes analyzing the first passage to determine a congruency score for the first ontological relationship. And at block 1214, the method 1200 includes generating a relationship annotation between the first entity and the second entity in the first passages based on the congruency score being within a threshold.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
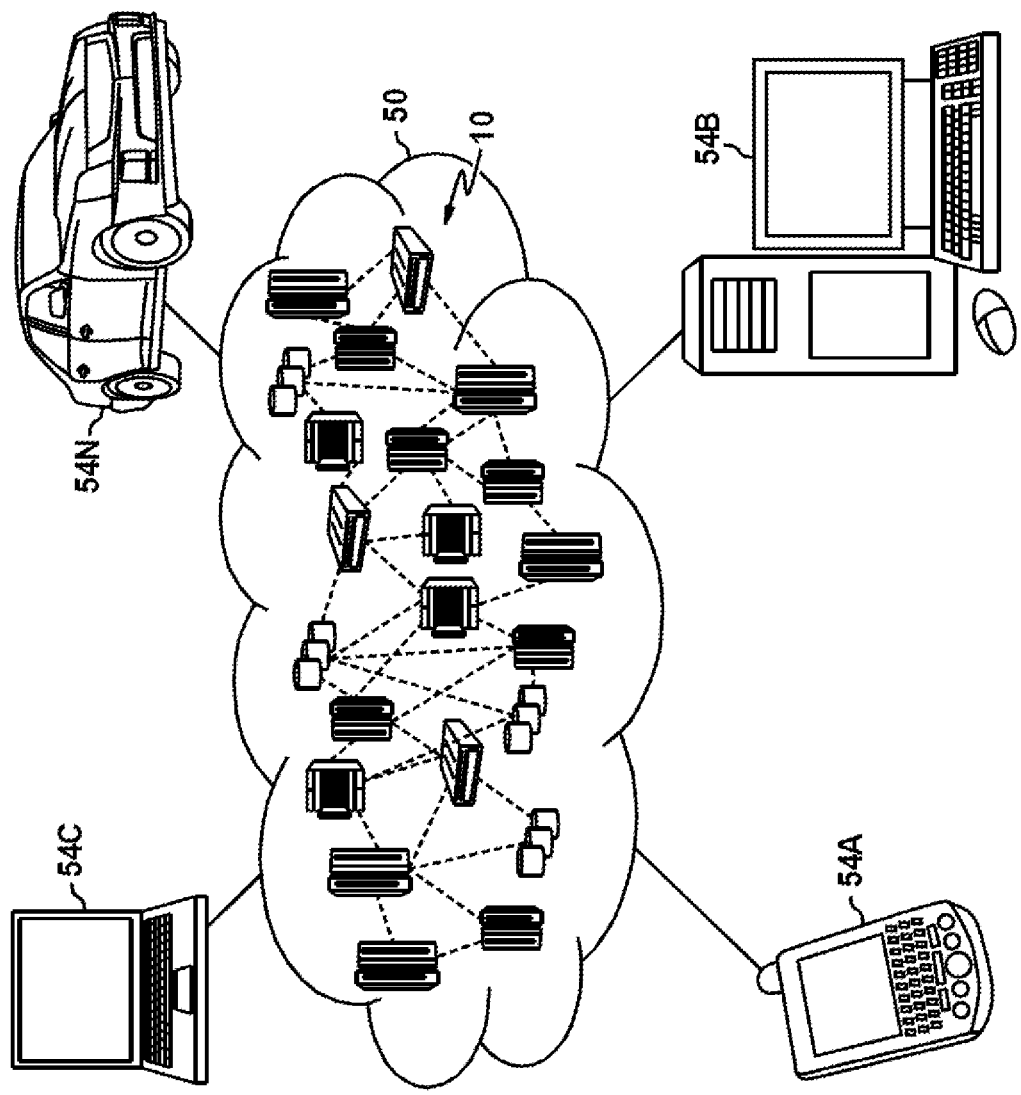
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
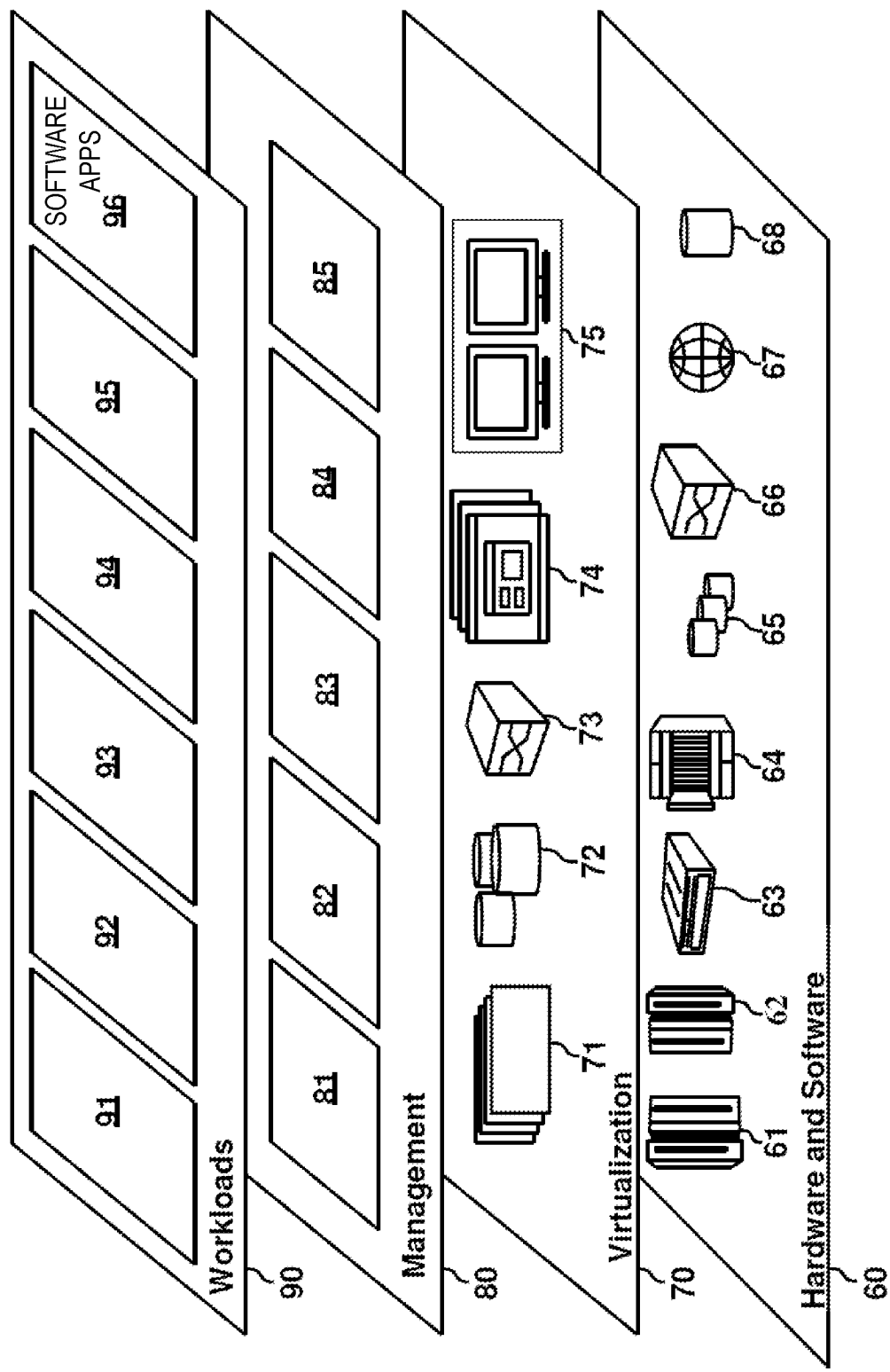
FIG. 9 depicts abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204, typeahead search functions 232, and NLP services 212) implemented in workloads and functions 96. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was

What is claimed is:

1. A computer-implemented method comprising:
receiving, by a processor, a request from a user device, the request comprising a custom ontology as a structure having a plurality of entities and relationships between the plurality of entities, wherein the custom ontology having been received from the user device is to be associated with a search query;
in response to receiving the custom ontology transmitted from the user device, updating, by the processor, a semantic search function with the custom ontology and a custom ontology index in place of an original ontology, the semantic search function initially supporting the original ontology originally having been used to enrich a corpus, the custom ontology being separate and distinct from the original ontology having enriched the corpus, wherein the corpus comprises documents enriched by annotations in which the original ontology is used to generate the annotations, wherein natural language processing uses the original ontology to generate the annotations such that the annotations are between co-occurring entities linked within the original ontology, wherein the custom ontology index is configured to index the custom ontology using a string match;
in response to using the custom ontology to replace the original ontology to augment input of the search query for the semantic search function to search the corpus, generating suggestions for the search query as a user is entering the search query by using the custom ontology and the custom ontology index in place of the separate ontology for the suggestions such that the suggestions displayed are from the custom ontology, thereby providing a custom user experience for searching the corpus; and
searching the corpus using the custom ontology, in response to the search query of the custom ontology being mapped to the original ontology.

2. The computer-implemented method of claim 1, wherein the custom ontology is different from the separate ontology.

3. The computer-implemented method of claim 1, wherein the custom ontology is received from the user and is curated independently from the separate ontology.

4. The computer-implemented method of claim 1, wherein using the custom ontology to augment the input of the search query for the semantic search function comprises generating the suggestions associated with the input of the search query.

5. The computer-implemented method of claim 1, wherein the custom user experience for searching the corpus comprises generating the suggestions using the custom ontology.

6. The computer-implemented method of claim 1, wherein the custom user experience for searching the corpus comprises generating the suggestions using the custom ontology and the separate ontology.

7. The computer-implemented method of claim 1, wherein the custom user experience for searching the corpus comprises generating the suggestions using the custom ontology while avoiding execution of natural langue processing (NLP) on the corpus with the custom ontology.

8. The computer-implemented method of claim 1, wherein software is provided as a service in a cloud environment for providing the custom user experience for searching the corpus using the custom ontology to augment the input of the search query.

9. A system comprising:
a memory having computer readable instructions; and
one or more processors for executing the computer readable instructions, the computer readable instructions controlling the one or more processors to perform operations comprising:
receiving, by a processor, a request from a user device, the request comprising a custom ontology as a structure having a plurality of entities and relationships between the plurality of entities, wherein the custom ontology having been received from the user device is to be associated with a search query;
in response to receiving the custom ontology transmitted from the user device, updating a semantic search function with the custom ontology and a custom ontology index in place of an original ontology, the semantic search function initially supporting the original ontology originally having been used to enrich a corpus, the custom ontology being separate and distinct from the original ontology having enriched the corpus, wherein the corpus comprises documents enriched by annotations in which the original ontology is used to generate the annotations, wherein natural language processing uses the original ontology to generate the annotations such that the annotations are between co-occurring entities linked within the original ontology, wherein the custom ontology index is configured to index the custom ontology using a string match;
in response to using the custom ontology to replace the original ontology to augment input of the search query for the semantic search function to search the corpus, generating suggestions for the search query as a user is entering the search query by using the custom ontology and the custom ontology index in place of the separate ontology for the suggestions such that the suggestions displayed are from the custom ontology, thereby providing a custom user experience for searching the corpus; and
searching the corpus using the custom ontology, in response to the search query of the custom ontology being mapped to the original ontology.

10. The system of claim 9, wherein the custom ontology is different from the separate ontology.

11. The system of claim 9, wherein the custom ontology is received from the user and is curated independently from the separate ontology.

12. The system of claim 9, wherein using the custom ontology to augment the input of the search query for the semantic search function comprises generating the suggestions associated with the input of the search query.

13. The system of claim 9, wherein the custom user experience for searching the corpus comprises generating the suggestions using the custom ontology.

14. The system of claim 9, wherein the custom user experience for searching the corpus comprises generating the suggestions using the custom ontology and the separate ontology.

15. The system of claim 9, wherein the custom user experience for searching the corpus comprises generating the suggestions using the custom ontology while avoiding execution of natural langue processing (NLP) on the corpus with the custom ontology.

16. The system of claim 9, wherein software is provided as a service in a cloud environment for providing the custom user experience for searching the corpus using the custom ontology to augment the input of the search query.

17. A computer program product comprising a computer readable storage medium having program instructions embodied therewith, the program instructions executable by a processor to cause the processor to perform operations comprising:

receiving, by a processor, a request from a user device, the request comprising a custom ontology as a structure having a plurality of entities and relationships between the plurality of entities, wherein the custom ontology having been received from the user device is to be associated with a search query;

in response to receiving the custom ontology transmitted from the user device, updating a semantic search function with the custom ontology and a custom ontology index in place of an original ontology, the semantic search function initially supporting the original ontology originally having been used to enrich a corpus, the custom ontology being separate and distinct from the original ontology having enriched the corpus, wherein the corpus comprises documents enriched by annotations in which the original ontology is used to generate the annotations, wherein natural language processing uses the original ontology to generate the annotations such that the annotations are between co-occurring entities linked within the original ontology, wherein the custom ontology index is configured to index the custom ontology using a string match;

in response to using the custom ontology to replace the original ontology to augment input of the search query for the semantic search function to search the corpus, generating suggestions for the search query as a user is entering the search query by using the custom ontology and the custom ontology index in place of the separate ontology for the suggestions such that the suggestions displayed are from the custom ontology, thereby providing a custom user experience for searching the corpus; and searching the corpus using the custom ontology, in response to the search query of the custom ontology being mapped to the original ontology.

18. The computer program product of claim 17, wherein the custom ontology is different from the separate ontology.

19. The computer program product of claim 17, wherein the custom ontology is received from the user and is curated independently from the separate ontology.

20. The computer-implemented method of claim 1, wherein the custom ontology index of the custom ontology is utilized to provide a look-up for the semantic search function.

* * * * *